US008208681B2

(12) United States Patent
Heller et al.

(10) Patent No.: US 8,208,681 B2
(45) Date of Patent: Jun. 26, 2012

(54) IMAGE ANALYSIS SYSTEM FOR DETECTING PERSONAL PROTECTIVE EQUIPMENT COMPLIANCE

(75) Inventors: Jeffrey R. Heller, Neenah, WI (US); Sridhar Ranganathan, Suwanee, GA (US); Shawn J. Sullivan, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 1222 days.

(21) Appl. No.: 11/961,992

(22) Filed: Dec. 20, 2007

(65) Prior Publication Data
US 2009/0161918 A1   Jun. 25, 2009

(51) Int. Cl.
*G06K 9/00* (2006.01)
(52) U.S. Cl. ........ 382/100; 382/181; 382/286; 382/291; 340/500; 340/540; 340/573.1; 340/686.1; 340/686.2
(58) Field of Classification Search .................. 382/100, 382/181, 286, 291, 325; 340/500, 540, 573.1, 340/686.1, 686.2
See application file for complete search history.

(56) References Cited

U.S. PATENT DOCUMENTS

| | | | |
|---|---|---|---|
| 5,023,597 A | 6/1991 | Salisbury | |
| 5,164,707 A | 11/1992 | Rasmussen et al. | |
| 5,796,341 A | 8/1998 | Stratiotis | |
| 6,151,717 A | 11/2000 | Lindgren et al. | |
| 6,256,396 B1 | 7/2001 | Cushman | |
| 6,695,093 B1 | 2/2004 | Falco | |
| 6,853,303 B2 | 2/2005 | Chen et al. | |
| 6,856,852 B1* | 2/2005 | Bruinsma et al. | 340/532 |
| 6,920,956 B1 | 7/2005 | Falco | |
| 6,922,632 B2 | 7/2005 | Foxlin | |
| 7,065,645 B2 | 6/2006 | Teicher | |
| 7,185,734 B2 | 3/2007 | Widmer et al. | |
| 7,319,399 B2* | 1/2008 | Berg | 340/573.1 |
| 2006/0044140 A1 | 3/2006 | Berg | |
| 2006/0045284 A1 | 3/2006 | Haussmann et al. | |
| 2006/0140425 A1 | 6/2006 | Berg et al. | |
| 2006/0219961 A1 | 10/2006 | Ross et al. | |
| 2006/0220787 A1 | 10/2006 | Turner et al. | |
| 2006/0268482 A1 | 11/2006 | Lin et al. | |
| 2008/0116680 A1* | 5/2008 | Mita et al. | 340/573.1 |
| 2009/0040014 A1* | 2/2009 | Knopf et al. | 340/5.1 |

OTHER PUBLICATIONS

International Search Report and Written Opinion regarding PCT/IB2008/055392, dated Jul. 27, 2009.

* cited by examiner

*Primary Examiner* — Matthew Bella
*Assistant Examiner* — Eric Rush
(74) *Attorney, Agent, or Firm* — Armstrong Teasdale LLP

(57) ABSTRACT

Embodiments of the invention relate to an image analysis system for detecting compliance with requirements for using personal protective equipment (PPE). An image capturing device may be used to acquire an image of an individual requesting entry into a restricted area. In turn, a PPE analysis tool may be configured to analyze the image to detect the presence of the PPE, e.g., by recognizing markings made using UV fluorescent dye, reflective ink, or other marking materials visible in the captured image and/or the physical shape of the PPE. The image analysis tool may be further configured to demine not only whether the required PPE is present, but also determine whether the PPE is being worn correctly by the individual requesting access to the restricted area.

29 Claims, 6 Drawing Sheets

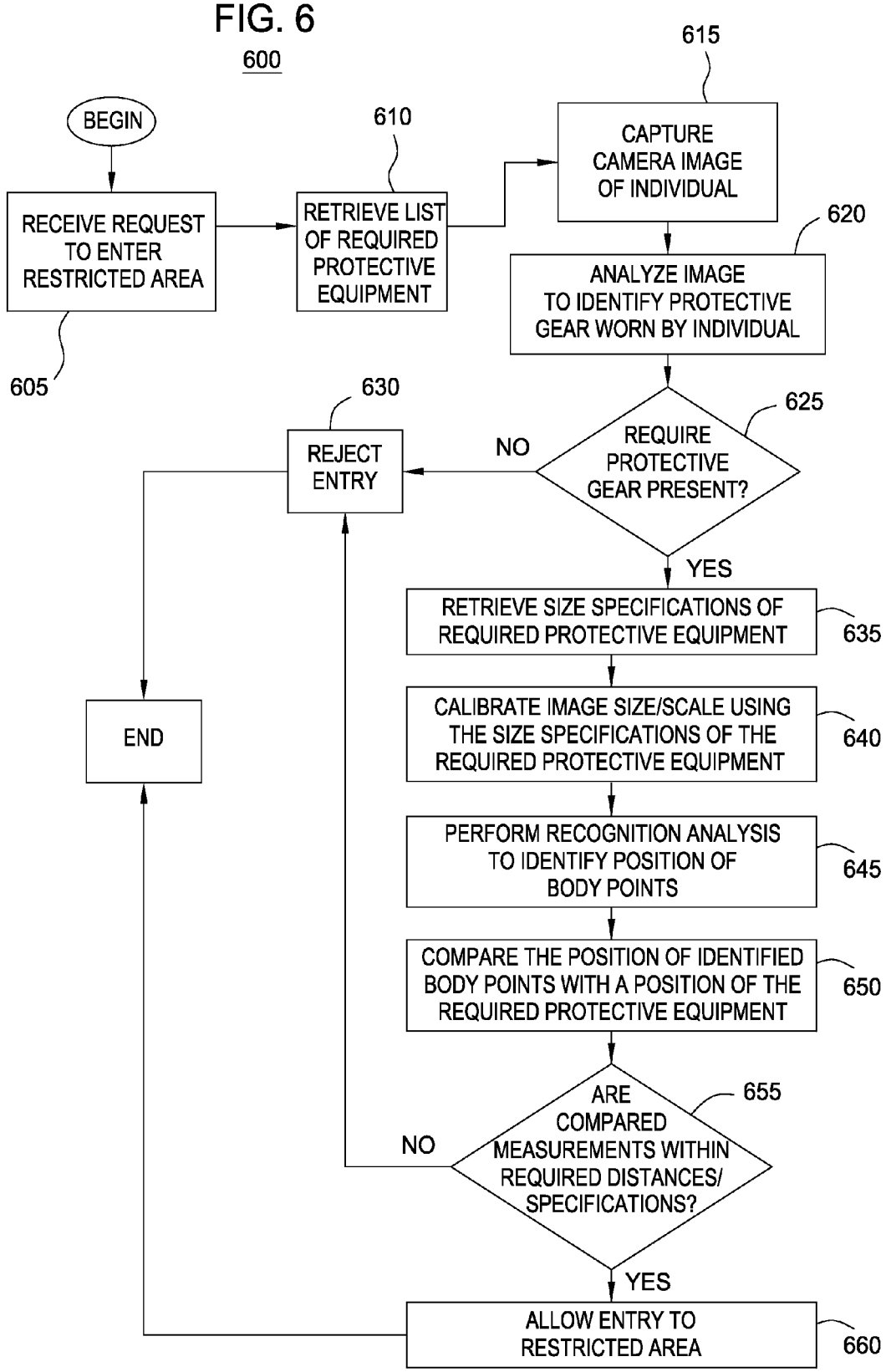

IMAGE ANALYSIS SYSTEM FOR DETECTING PERSONAL PROTECTIVE EQUIPMENT COMPLIANCE

BACKGROUND OF THE INVENTION

1. Field of the Invention

Embodiments of the invention generally relate to improving workplace safety. More specifically, embodiments of the invention relate to an image analysis system for detecting worker compliance with requirements for using personal protective equipment.

2. Description of the Related Art

Many workplace environments include safety hazards. For example, in a manufacturing environment, industrial equipment can be a serious threat to worker safety. Similarly, food processing and packaging plants may present employees with a variety of hazardous situations. To help prevent worker injury, workplace safety rules may require that each individual use and/or wear the appropriate personal protective equipment (PPE) in restricted areas of a production facility.

However, the effectiveness of any PPE in protecting worker safety is substantially dependent on individual compliance with the workplace safety rules. That is, ultimately, PPE is useless if employees disregard safety rules or fail to wear the correct PPE. Unfortunately though, research in this area demonstrates that a high percentage of workplace injures are related to non-compliance with PPE regulations. Accordingly, industrial safety managers are looking for safety products that may improve compliance with requirements that workers use and/or wear PPE. One proposed approach includes the use of RFID (Radio Frequency Identification) technology to help promote worker compliance with workplace safety rules. For example, U.S. Pat. No. 6,853,303 titled "RFID System and Method for Ensuring Personnel Safety" discloses an RFID marking scheme may be used to control access to a restricted area by marking required PPE with an RFID tag. Limitations with RFID technology, however, prevent such systems from detecting whether the PPE on a given individual is being worn properly or merely present in the area of the individual, e.g., an individual holding a hardhat, or wearing safety glasses on their forehead.

Accordingly, there remains a need for an image analysis system for improving worker compliance with requirements for using personal protective equipment.

SUMMARY OF THE INVENTION

Embodiments of the invention provide an image analysis system used to determine whether PPE is present and whether it is worn correctly.

One embodiment of the invention includes a method for detecting compliance with requirements for using personal protective equipment. The method may generally include capturing an image of an individual requesting access to a restricted area, where access to the restricted area requires that the individual wear one or more personal protective equipment (PPE) items within the restricted area. The method may also include analyzing the image to determine whether the one or more PPE items are depicted in the image. Upon determining the one or more PPE items are depicted in the image; it may be determined whether the one or more PPE items are being worn correctly by the individual, based on one or more predefined dimensions of the one or more PPE items depicted in the image. Further, upon determining the one or more PPE items are (or are not) being correctly worn by the individual, the individual may be granted (or denied) access to the restricted area.

In a particular embodiment, the method may also include calibrating a conversion factor used to convert a measured number of pixels into a measured distance, wherein the measured distance is compared to the one or more predefined dimensions to determine whether the one or more PPE items are being worn correctly by the individual. The conversion factor may be determined using a known measurement of a size dimension of one of the PPE items and a number of pixels required to depict the PPE item in the captured image. To facilitate the identification and measurement, the PPE items may be marked using a UV fluorescent dye, reflective ink, or other marking materials visible in the captured image. In such a case, the step of analyzing the image may include detecting the presence or pattern of the UV fluorescent dye (or other marking material).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 illustrates a method for using an image analysis system for detecting worker compliance with requirements for using personal protective equipment, according to one embodiment of the invention.

DETAILED DESCRIPTION

Figure 1:
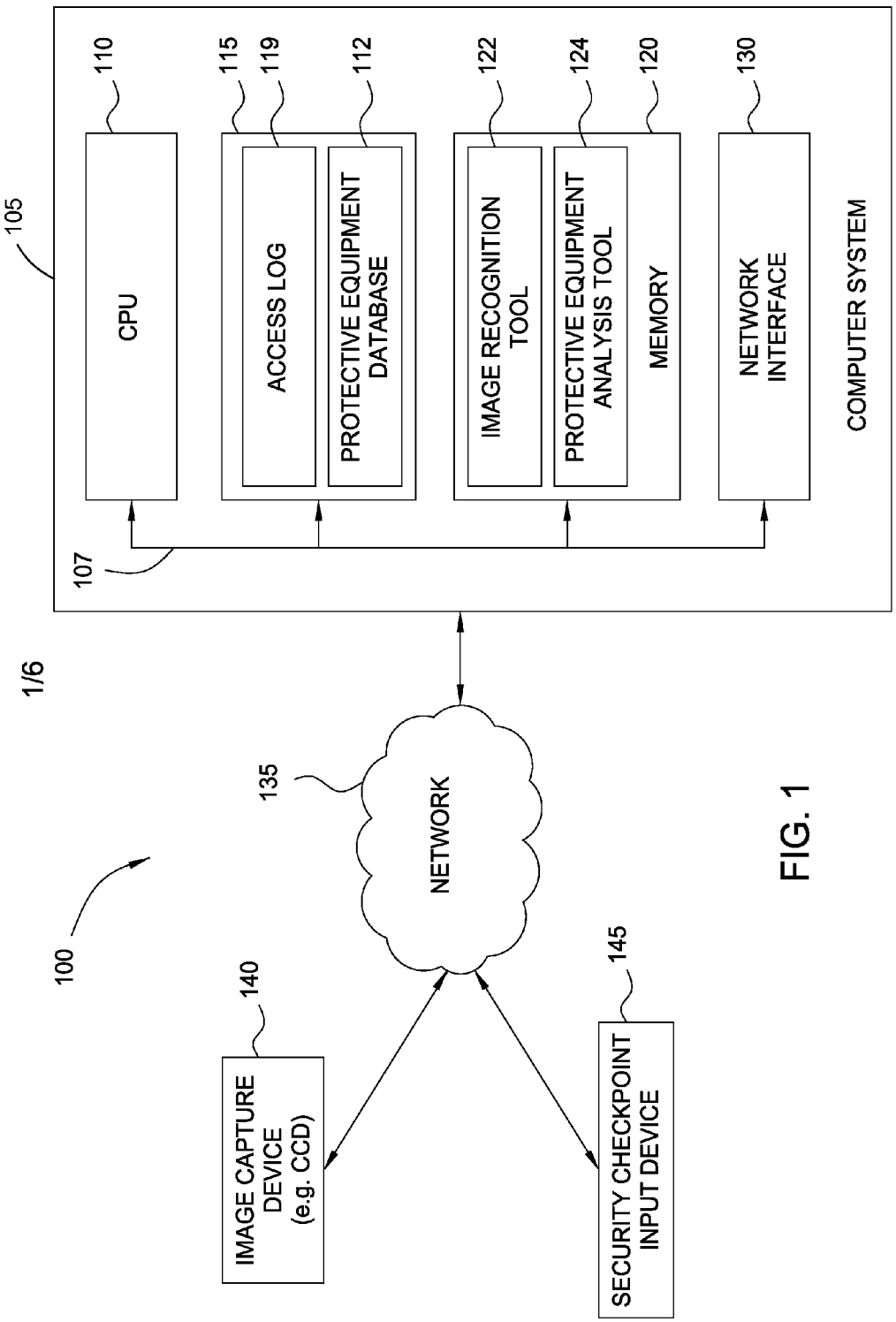
FIG. 1 illustrates an example image analysis system configured to detect compliance with requirements for using personal protective equipment, according to one embodiment of the invention.

Embodiments of the invention relate to an image analysis system for detecting compliance with requirements for using personal protective equipment (PPE). In one embodiment, a charge-coupled device (CCD), or other image capturing device, may be used to acquire an image of an individual requesting entry into a restricted area. Workplace safety rules may require that individuals wear or use certain PPE within the restricted area. Examples of PPE include protective goggles, glasses or other eyewear, gloves, hats, coats, aprons, gowns, shoes, ear-plugs, respirators, or other items of clothing or equipment used for workplace safety. Additionally, in one embodiment, the PPE may be marked using UV fluorescent dye (or other inks, dyes or marking materials) that illuminates in the CCD image. A PPE analysis tool may be configured to analyze the image to detect the presence of the PPE, e.g., by recognizing the ink marking and/or the physical shape of the PPE. In an alternative embodiment, the PPE may also be marked using an RFID tag, in such a case, an RFID sensing device may be configured to detect the presence of the PPE.

If the PPE is identified in the image (or determined to be present based on an RFID tag), the image analysis tool may evaluate whether the PPE is not only present, but being worn properly by the individual. Only when the individual is properly wearing the correct PPE does the system grant the individual with access to the restricted area. In one embodiment, the image analysis tool may be configured to identify areas in the image that have a recognized pattern of pixels associated with the required PPE items to determine the presence of particular PPE items. For example, the image analysis tool may identify edges of objects in the image by looking for significant changes in contrast levels from one set of pixels to an adjacent set of pixels. Further, a group of intersecting edges may form a "blob," (i.e., a connect region of pixels bound by the intersected edges) and the shape of the resulting blob may be compared with patterns associated with the required PPE items. Of course, other image analysis techniques may be used.

Using a calibration procedure, the pixels are given a dimension so that distance measurements may be calculated from the image. For example, if a lens of required protective eyewear is known to be two inches high, and is present in an image using 250 pixels, then a scaling factor of 125 pixels per inch may be used to determine measurements for other distances in the image. In the case of protective eyewear, for example, if measurements of the image suggest that the top of the eyewear is between one and three inches of the top of an individual's head, as well as relatively centered between a left and right edges of the individual's head, then the system may conclude not only that the required PPE is present (e.g., as indicated by detected presence of UV markings or RFID tag), but that the individual is wearing the eyewear correctly (as indicated by measurements of the image). Accordingly, the system may grant such an individual with access to the restricted area. If the required PPE is not present (or not worn properly), the system may deny access to the requested area, or, alternatively, may simply remind the individual that workplace safety rules require safety glasses be worn when entering the restricted area. Further, in conjunction with other systems, e.g., an ID badge reading system or numeric key-pad locking system, patterns of compliance (or non-compliance) may be identified. Doing so may lead to improved workplace safety, as individuals demonstrating a history of non-compliance may be identified and targeted for additional training.

The following description references embodiments of the invention. However, it should be understood that the invention is not limited to any specifically described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a software application for use with a computer system. The program(s) of the software application define functions of the embodiments (including the methods described herein) and can be contained on a variety of computer-readable media. Illustrative computer-readable media include, but are not limited to: (i) non-writable storage media on which information is permanently stored (e.g., read-only memory devices within a computer such as CD-ROM or DVD-ROM disks readable by a CD-ROM or DVD-ROM drive); (ii) writable storage media on which alterable information is stored (e.g., floppy disks within a diskette drive, hard-disk drives, or flash memory devices). Other media include communications media through which information is conveyed to a computer, such as through a computer or telephone network, including wireless communications networks. The latter embodiment specifically includes transmitting information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates an example image analysis system 100 configured to detect compliance with requirements for using personal protective equipment, according to one embodiment of the invention. As shown, system 100 includes an image capture device 140, a security checkpoint input device 145, and a computer system 105, all connected by a network 135. Image capture device 140 represents an electronic device used to capture an image of an individual requesting access to a restricted area that requires the individual to wear certain PPE (e.g., safety glasses). The image may be analyzed to determine whether the requesting individual is properly wearing the correct PPE before granting, or denying, access to the restricted area. In one embodiment, the image capture device 140 may be a charge-coupled device (CCD). As is known, a CCD provides a light-sensitive image device that includes a large-scale integrated circuit containing hundreds of thousands of photo-sites (pixels) that convert light energy into electronic signals. Of course, other image capturing technology may be used. Also, the image capture device may be integrated with the security checkpoint input device 145. In turn, the security checkpoint input device 145 may control access to the restricted area. For example, the security checkpoint input device 145 may provide an electronic badge reader or keypad. When an individual uses the security checkpoint input device 145 to request access to the restricted area, the image capture device 140 may capture an image of the individual and transmit it over network 135 to computer system 105 for analysis.

Illustratively, computer system 105 includes a CPU 110, storage 115, a memory 120 and a network interface 130 all connected by a bus 107. CPU 110 provides a processor configured to execute a sequence of instructions provided by an application program stored in memory 120. Storage 115 provides any combination of hard disk drives, flash-memory devices, network or virtual storage devices, and the like.

As shown, storage 115 includes a protective equipment database 112. In one embodiment, the protective equipment database 112 includes descriptions of PPE. For example, the descriptions may include image pixel patterns associated with the required PPE items (e.g., safety glasses) along with marking patterns expected to be found on approved PPE items. Also as shown, memory 120 includes an image recognition tool 122 and a protective equipment analysis tool 124. As stated above, when an individual uses the security checkpoint input device 145 to request access to the restricted area, the image capture device 140 may capture an image of the individual. In turn, the image recognition tool 122 may be configured to evaluate whether the requesting individual is wearing the correct PPE items. In one embodiment, the image recognition tool 122 may provide a software application configured to analyze the captured image to identify a particular object (or objects); namely, the required PPE item (or items). For example, edges of objects in the image may be identified by detecting significant changes in contrast levels from one set of pixels to an adjacent set of pixels. A group of intersecting edges may form a "blob," and the shape of the resulting "blob" may be compared to patterns of the PPE items or markings on the PPE items made using UV fluorescent dye, inks or other marking materials. Alternatively, an RFID sensing device may be used to detect the presence of a required PPE item being worn by an individual (not shown).

In one embodiment, once the presence of a required PPE item is identified in the image, protective equipment analysis tool 124 may further analyze the captured image to determine whether the position/placement of the item suggests that the PPE item is being worn correctly by the individual.

Access log 119 provides a log file used to record a variety of information regarding the results of image processing. For example, access log 119 may store an indication of who was (or was not) granted access to a restricted area. Such information may be used to help improve compliance with workplace safety rules, e.g., by identifying individuals demonstrating a pattern of non-compliance, or identifying trends of either false positives or false negatives.

Network interface 130 provides a means for connecting computer system 105 to network 135. In one embodiment, network interface 130 may connect computer system 105 to a TCP/IP based network. Note however, although FIG. 1 shows computer system 105 connected to image capture system 140 and security checkpoint input device 145 over the network 135, in other embodiments, the connections between these systems may use other communication mechanisms. e.g., a USB, a Firewire or a serial connection. Further, embodiments of the invention may be implemented using an integrated device that includes the image capture device 140, security checkpoint input device 145 and components of computer system 105 needed to provide an image analysis system for detecting worker compliance with requirements for using personal protective equipment (e.g., an application specific integrated circuit (ASIC)). Similarly, in another embodiment, a microcontroller may be configured to run an image analysis algorithm. In such a case, the microcontroller would include an on-board memory storing an image analysis program and also include a means to communicate with the door locking mechanism and an image capturing device.

Figure 2:
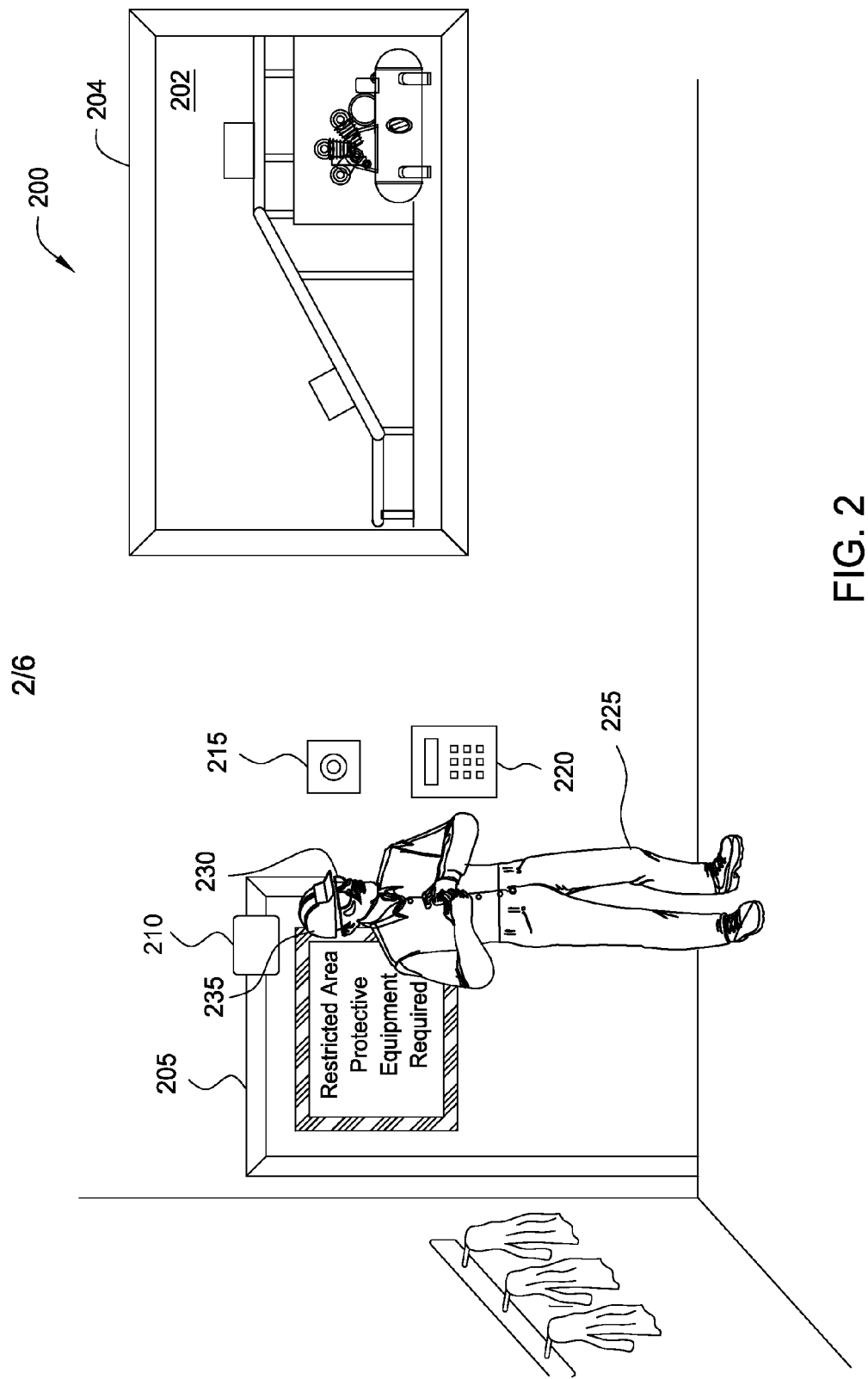
FIG. 2 illustrates an example image analysis system used to control access to a restricted area based on requirements for using personal protective equipment, according to one embodiment of the invention.

FIG. 2 illustrates an example of an environment 200 that includes an image analysis system used to control access to a restricted area 202 based on workplace rules requiring the use of personal protective equipment, according to one embodiment of the invention. As shown, a door 205 provides an entry into the restricted area 202 (seen through a window 204). In this example, the door 205 is closed and locked using a magnetic locking mechanism 210, and access to the restricted area 202 may be made through the door 205 using keypad 220 and image capture device 215 (e.g., a CCD).

Additionally, the example depicted in FIG. 2 includes a person 225 wearing glasses 230 and a hardhat 235. Assume for this example that workplace safety rules require that the individual 225 wear both glasses 230 and hardhat 235 whenever entering the restricted area 202. In one embodiment, to gain access to the restricted area 202, the individual 225 enters an access number using keypad 220. In turn, the image capturing device 215 may take a picture of the individual 225 and transmit it to image processing tools (e.g., image recognition tool 122 and a protective equipment analysis tool 124 shown in FIG. 1) configured to determine whether the individual 225 is wearing the required PPE. In this case, as the individual 225 is wearing the glasses 230 and hardhat 235, the individual 225 may be granted accesses to the restricted area 202 (e.g., by unlocking the magnetic locking mechanism 210). Further, in one embodiment, whether (or not) access is granted, or whether the individual 225 needed to be prompted to wear the required PPE, may be stored in an access log (e.g., the access log 119 shown in FIG. 1).

Figure 3:
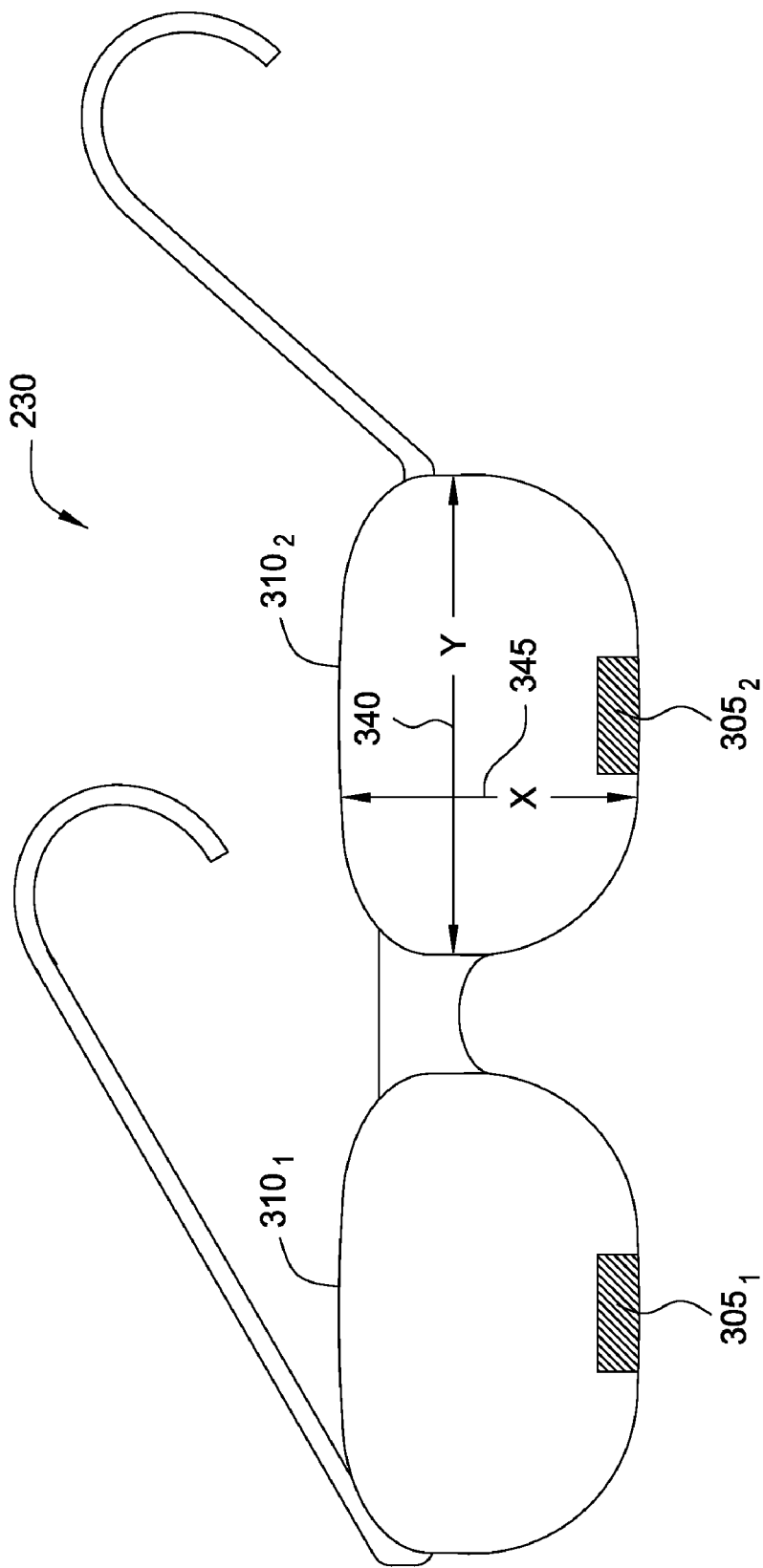
FIGS. 3 and 4 illustrate examples of personal protective equipment, according to one embodiment of the invention.
Figure 4:
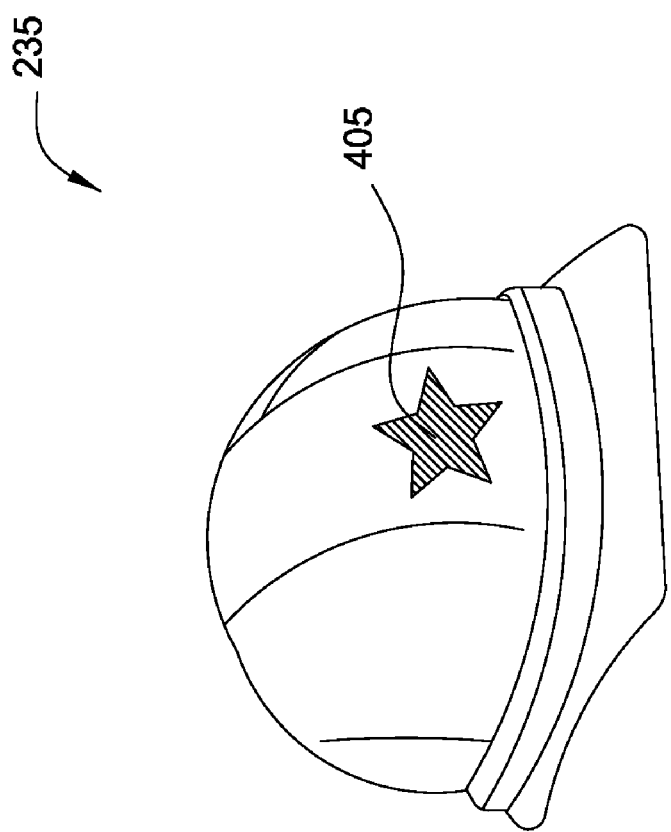

FIGS. 3 and 4 illustrate examples of personal protective equipment, according to one embodiment of the invention. Specifically, FIG. 3 illustrates an example of glasses 230. As shown, a marking material has been used to create a mark $305_1$ and a mark $305_2$ on lenses $310_1$ and $310_2$, respectively. Although marks $305_{1-2}$ are shown as a darkened mark on lenses $310_1$ and $310_2$, one of ordinary skill in the art will recognize that marks made with UV fluorescent dye may not be visible to the naked eye. Of course, other dyes, reflective inks, or marking materials visible in the captured image may be used. Additionally, glasses 230 have a particular size in an X (horizontal) dimension 345 and a Y (vertical) dimension 340. In one embodiment, the protective equipment analysis tool 124 may identify an image of glasses 230 based on the size or shape of the glasses and/or the size or shape of markings 305. Further, the image analysis tool 124 may be configured to determine a conversion factor from the known X (horizontal) dimension 345 and/or the Y (vertical) dimension 340 of the glasses 230 and a number of pixels used to depict the PPE item in an image captured using an image capturing device.

FIG. 4 illustrates another example of personal protective equipment. Specifically, FIG. 4 shows an image of hardhat 235 that includes a mark 405. Like the marks 305 described above relative to glasses 230, mark 405 may be created using UV fluorescent dye (or other marking material) visible on images taken using an image capturing device 140. However, mark 405 may also be created using an ink dye readily visible to the naked eye. Further, like glasses 230, the protective equipment analysis tool 124 may identify the hardhat 235 in an image based on the size of the glasses or on the size and/or shape of markings 305 (e.g., by identifying the star shaped pattern of mark 405).

Figure 5A:
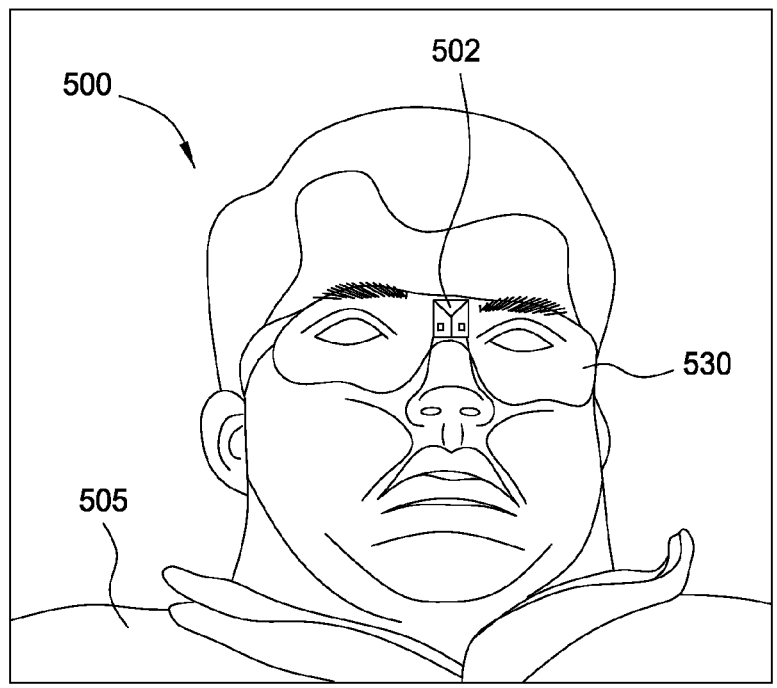
FIGS. 5A-5B illustrate an example of an image captured and analyzed using an image analysis system configured to detect compliance with requirements for using personal protective equipment, according to one embodiment of the invention.
Figure 5B:
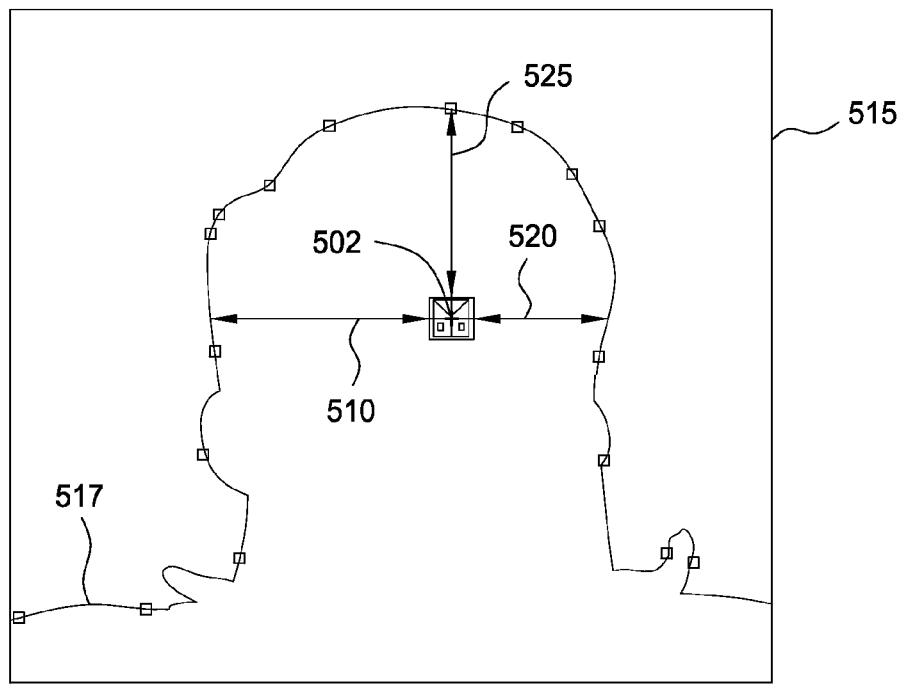

FIGS. 5A-5B illustrate an example of an image captured and analyzed using an image analysis system configured to detect compliance with requirements for using personal protective equipment, according to one embodiment of the invention. As shown in FIG. 5A, an image 500 depicts an individual 505 wearing safety glasses 530 which have a marked pattern 502 on the bridge of the safety glasses 530. As described above, in one embodiment, the image 500 may be analyzed to determine whether the individual 505 is wearing glasses 530 prior to being granted entry into a restricted area. FIG. 5B represents an analysis 515 of the image 500. In this example, an image recognition tool has identified a general outline of the individual's head 505, as represented by the outline of points 517, and identified the mark 502.

In one embodiment, a calibration procedure may be used to determine a scaling factor used to determine distance measurements from the image. For example, assume that the lenses of the safety glasses are 2.75 inches wide and 1.5 inches high. Further assume that in image 500, the lenses are depicted using 55 pixels across and using 30 pixels high. In such a case, a scaling factor of 20 pixels per inch may be used to measure the real physical distances between any two points depicted in image 500. Illustratively, arrows 520 and 525 each represent the distance from the mark 502 and the outline of the individual's head. Similarly, arrow 525 represents a distance from the mark 502 to the top of the individual's head. By counting the number of pixels in the image between mark 502 and outline 517, an approximation of the size and position of the glasses may be determined, i.e., the number of pixels covered by arrows 510, 520, and 525 may be scaled according to the scaling factor to approximate an actual linear distance for these measurements. In this case, such measurements would tend to suggest that not only are glasses 530 present, as indicated by the mark 502, but that the individual is wearing the eyewear correctly, as indicated by measurements of the image determined using arrows 510, 520, and 525.

FIG. 6 illustrates a method 600 for using an image analysis system for detecting worker compliance with requirements for using personal protective equipment, according to one embodiment of the invention. As shown, the method 600 begins at step 605 where the image analysis system receives a request to enter a restricted area. For example, FIG. 2 shows a person positioned at a security door while wearing glasses and a hardhat.

At step 610, a list of PPE required for entry into the restricted area is retrieved. At step 615, an image capturing device (e.g., a CCD) captures an image of the individual requesting access to the restricted area. At step 620, an image analysis tool may identify one or more PPE items being worn by the individual. As discussed above, for example, the image analysis tool may identify edges of objects in the image by looking for significant changes in contrast levels from one set of pixels to an adjacent set of pixels. Further, a group of intersecting edges may form a "blob," and the shape of the resulting blob may be compared with patterns associated with the required PPE items. In one embodiment, approved PPE items may be marked with a UV fluorescent dye, reflective ink, or other marking materials visible in the captured image. In such a case, the markings may provide regions of high contrast easily identified by the image analysis tool. Further still, by marking different items of PPE using markings of different sizes and or shapes, the image analysis tool may identify what particular items of PPE are depicted in the image.

At step 625, the system may determine whether the PPE required for entry into the restricted area is present in the image captured at step 615. Alternatively, an RFID sensing device may be used to detect the presence of a required PPE item marked with an RFID that is being worn by an individual. If not, then at step 630, the system may deny the individual access to the requested area, or, alternatively, may simply remind the individual that workplace safety rules require safety glasses be worn when entering the restricted area.

Otherwise, if the PPE required for entry is depicted in the image captured at step 615, then at steps 635-650, the protective equipment analysis tool may determine whether the PPE is being worn properly by the individual requesting access to the restricted area. At step 635, the protective equipment analysis tool may retrieve information specifying sizes or dimensions of the required PPE. For example, as depicted in FIG. 3, glasses 230 have a known horizontal and vertical lens size. Using this information, at step 640, the protective equipment analysis tool may calibrate an image size/scale using the size specifications. For example, as described above, the number of pixels used in the image may be used to determine a scaling factor for measuring the length/size of other objects depicted in the image captured at step 615. At step 645, the protective equipment analysis tool may identity the position of relevant body points. For example, FIG. 5B illustrates a collection of body points used to form an outline of an individual's head based on the individual depicted in the image of FIG. 5A. At step 650, the protective equipment analysis tool may be configured to compare the position of the identified body points and the PPE items with a preferred position, in order to determine whether the individual is properly wearing the protective equipment. If not, then at step 630, the system may deny the individual access to the requested area, or, alternatively, may simply remind the individual that PPE items required by workplace safety rules should be worn correctly before entering the restricted area.

Otherwise, if the individual is determined to be both wearing the correct PPE items (as determined at step 625) and wearing the PPE items in the correct positions (as determined at step 655), then, at step 660, the system may grant the individual with access to the restricted area. Further, in one embodiment, the results of the image processing may be stored in an access log.

Advantageously, embodiments of the invention may be used to improve compliance with workplace safety rules that require workers to use and/or wear certain PPE items (e.g., safety glasses, protective head gear, etc). As described herein, a charge-coupled device (CCD), or other image capturing device, may be used to acquire an image of an individual requesting entry into a restricted area. In turn, a PPE analysis tool may be configured to analyze the image to detect the presence of the PPE, e.g., by recognizing markings made using UV fluorescent dye, reflective ink, or other marking materials) visible in the captured image and/or the physical shape of the PPE. The image analysis tool may be further configured to demine not only whether the required PPE is present, but also determine whether the PPE is being worn correctly by the individual requesting access to the restricted area.

While the foregoing is directed to embodiments of the present invention, other and further embodiments of the invention may be devised without departing from the basic scope thereof, and the scope thereof is determined by the claims that follow.

What is claimed is:

1. A method for detecting compliance with requirements for using personal protective equipment, the method comprising:

capturing an image of an individual requesting access to a restricted area, wherein access to the restricted area requires that the individual wear one or more personal protective equipment (PPE) items within the restricted area;

analyzing the image to determine whether the one or more PPE items are depicted in the image; and upon determining the one or more PPE items are depicted in the image:

determining whether the one or more PPE items are being worn correctly by the individual, based on one or more predefined dimensions of the one or more PPE items depicted in the image.

2. The method of claim 1, further comprising, calibrating a conversion factor used to convert a measured number of pixels into a measured distance, wherein the measured distance is compared to the one or more predefined dimensions to determine whether the one or more PPE items are being worn correctly by the individual.

3. The method of claim 2, wherein the conversion factor is determined using a known measurement of a size dimension of one of the PPE items and a number of pixels required to depict the PPE item in the captured image.

4. The method of claim 1, further comprising:

upon determining the one or more PPE items are being correctly worn by the individual, granting the individual access to the restricted area; and upon determining the one or more PPE items are not being correctly worn by the individual, denying the individual access to the restricted area.

5. The method of claim 1, further comprising, upon determining the one or more PPE items are not depicted in the image, denying the individual access to the restricted area.

6. The method of claim 1, further comprising, upon determining the one or more PPE items are not depicted in the image, notifying the individual that the one or more PPE items are required for access to the restricted area.

7. The method of claim 1, further comprising, storing the determination of whether the one or more PPE items are being worn correctly by the individual in an access log.

8. The method of claim 1, wherein at least one of the PPE items comprises safety eyewear, a hardhat, gloves, a coat, an apron, a gown, shoes, ear-plugs, and a respirator.

9. The method of claim 1, wherein at least one of the PPE items is marked using a UV fluorescent dye, and wherein analyzing the image to determine whether the one or more PPE items are depicted in the image comprises detecting at least one of the presence and pattern of the UV fluorescent dye marking.

10. A computer-readable storage medium containing a program configured to detect compliance with requirements for using personal protective equipment, the program including instructions for performing an operation, comprising:

capturing an image of an individual requesting access to a restricted area, wherein access to the restricted area requires that the individual wear one or more personal protective equipment (PPE) items within the restricted area;

analyzing the image to determine whether the one or more PPE items are depicted in the image; and upon determining the one or more PPE items are depicted in the image:

determining whether the one or more PPE items are being worn correctly by the individual, based on one or more predefined dimensions of the one or more PPE items depicted in the image.

11. The computer-readable storage medium of claim 10, wherein the operation further comprises calibrating a conversion factor used to convert a measured number of pixels into a measured distance, wherein the measured distance is compared to the one or more predefined dimensions to determine whether the one or more PPE items are being worn correctly by the individual.

12. The computer-readable storage medium of claim 11, wherein the conversion factor is determined using a known measurement of a size dimension of one of the PPE items and a number of pixels required to depict the PPE item in the captured image.

13. The computer-readable storage medium of claim 10, wherein the operation further comprises:

upon determining the one or more PPE items are being worn correctly by the individual, granting the individual access to the restricted area; and upon determining the one or more PPE items are not being worn correctly by the individual, denying the individual access to the restricted area.

14. The computer-readable storage medium of claim 10, wherein the operation further comprises, upon determining the one or more PPE items are not depicted in the image, denying the individual access to the restricted area.

15. The computer-readable storage medium of claim 10, wherein the operation further comprises, upon determining the one or more PPE items are not depicted in the image, notifying the individual that the one or more PPE items are required for access to the restricted area.

16. The computer-readable storage medium of claim 10, further comprising, storing the determination of whether the one or more PPE items are being worn correctly by the individual in an access log.

17. The computer-readable storage medium of claim 10, wherein at least one of the PPE items comprises safety eyewear, a hardhat, gloves, a coat, an apron, a gown, shoes, ear-plugs, and a respirator.

18. The computer-readable storage medium of claim 10, wherein at least one of the PPE items is marked using a UV fluorescent dye, and wherein analyzing the image to determine whether the one or more PPE items are depicted in the image comprises detecting at least one of the presence and pattern of the UV fluorescent dye marking.

19. A system, comprising:

an image capturing device configured to capture an image of an individual requesting access to a restricted area, wherein access to the restricted area requires that the individual wear one or more personal protective equipment (PPE) items within the restricted area;

a computing device configured to receive the image from the image capturing device; and a memory storing an image analysis program configured to detect compliance with requirements for using personal protective equipment by performing an operation comprising:

analyzing the image to determine whether the one or more PPE items are depicted in the image; and upon determining the one or more PPE items are depicted in the image:

determining whether the one or more PPE items are being worn correctly by the individual, based on one or more predefined dimensions of the one or more PPE items depicted in the image.

20. The system of claim 19, wherein the operation further comprises calibrating a conversion factor used to convert a measured number of pixels into a measured distance, wherein the measured distance is compared to the one or more predefined dimensions to determine whether the one or more PPE items are being worn correctly by the individual.

21. The system of claim 20, wherein the conversion factor is determined using a known measurement of a size dimension of one of the PPE items and a number of pixels required to depict the PPE item in the captured image.

22. The system of claim 19, wherein the operation performed by the image analysis program is further comprises:
   upon determining the one or more PPE items are being correctly worn by the individual, granting the individual access to the restricted area; and
   upon determining the one or more PPE items are not being correctly worn by the individual, denying the individual access to the restricted area.

23. The system of claim 19, further comprising, a database system configured to store the determination of whether the one or more PPE items are being worn correctly by the individual in an access log.

24. The system of claim 19, wherein the image capturing device is a charge coupled device CCD.

25. The system of claim 19, wherein at least one of the PPE items comprises safety eyewear, a hardhat, gloves, a coat, an apron, a gown, shoes, ear-plugs, and a respirator.

26. The system of claim 19, wherein at least one of the PPE items is marked using a UV fluorescent dye, and wherein analyzing the image to determine whether the one or more PPE items are depicted in the image comprises detecting the presence or pattern of the UV fluorescent dye marking.

27. A method for detecting compliance with requirements for using personal protective equipment, the method comprising:
   receiving a request for access to a restricted area from an individual, wherein access to the restricted area requires that the individual wear one or more personal protective equipment (PPE) items within the restricted area;
   determining whether the individual is in possession of the one or more PPE items; and
   upon determining that the individual is in possession of the PPE items:
      capturing an image of the individual requesting access to the restricted area,
      analyzing the image to identify a depiction of the one or more PPE items, and
      determining whether the one or more PPE items are being worn correctly by the individual, based on one or more predefined dimensions of the one or more PPE items depicted in the image.

28. The method of claim 27, wherein determining whether the individual is in possession of the PPE items comprises detecting the presence of an radio frequency identification (RFID) tag used to mark at least one of the PPE items.

29. The method of claim 27, further comprising:
   upon determining the one or more PPE items are being correctly worn by the individual, granting the individual access to the restricted area; and
   upon determining the one or more PPE items are not being correctly worn by the individual, denying the individual access to the restricted area.

* * * * *